(12) United States Patent  
Lee, Jr.

(10) Patent No.: US 8,689,780 B1
(45) Date of Patent: *Apr. 8, 2014

(54) LOW PRESSURE FORCED AIR HEATER

(75) Inventor: Joseph B Lee, Jr., Bowling Green, KY (US)

(73) Assignee: Procom Heating, Inc., Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,288

(22) Filed: Apr. 2, 2012

Related U.S. Application Data

(63) Continuation of application No. 12/186,110, filed on Aug. 5, 2008, now Pat. No. 8,146,583.

(51) Int. Cl.
*F24H 3/02* (2006.01)

(52) U.S. Cl.
USPC .................... 126/110 B; 126/110 C; 432/222

(58) Field of Classification Search
USPC ........... 126/110 B, 110 C; 432/222, 223, 224
See application file for complete search history.

(56) References Cited

U.S. PATENT DOCUMENTS

| | | | |
|---|---|---|---|
| 2,658,308 A | 11/1953 | Fowler, Jr. et al. | |
| 3,101,193 A | 8/1963 | Varvel | |
| 3,319,947 A | 5/1967 | Truesdell | |
| 3,364,917 A | 1/1968 | Woollen, Jr. | |
| 3,706,446 A | 12/1972 | Briggs | |
| 4,002,157 A | 1/1977 | Toesca | |
| 4,081,238 A | 3/1978 | Briggs et al. | |
| 4,424,793 A | 1/1984 | Cooperrider | |
| 4,688,547 A | 8/1987 | Ballard et al. | |
| 5,865,618 A | 2/1999 | Hiebert | |
| 6,142,141 A | 11/2000 | Long | |
| 6,461,112 B1 | 10/2002 | Ohta et al. | |
| 8,146,583 B1 * | 4/2012 | Lee, Jr. | 126/110 B |
| 2006/0022164 A1 | 2/2006 | Su | |

* cited by examiner

*Primary Examiner* — Alfred Basichas
(74) *Attorney, Agent, or Firm* — Middleton Reutlinger; Chad D. Bruggeman; John F. Salazar

(57) ABSTRACT

A low pressure forced air heater is provided having a variable speed motor driving a fan and a compressor. An amount of the pneumatic output from the compressor is communicated through an air bleed valve and the remainder is communicated through an air output orifice. The air output orifice is in communication with a fuel nozzle and causes fuel to be drawn from a tank, atomized and combusted in a combustion chamber.

23 Claims, 5 Drawing Sheets

LOW PRESSURE FORCED AIR HEATER

CROSS-REFERENCE TO RELATED APPLICATIONS

This application is a continuation of and claims priority to, and benefit from, currently pending, U.S. patent application Ser. No. 12/186,110, filed on Aug. 5, 2008, the contents of the application is herein incorporated by reference.

BACKGROUND

1. Field of the Invention

The present invention is related generally to forced air heaters and more specifically to low pressure forced air heaters.

2. Description of Related Art

A low pressure forced air heater is a liquid-fueled heater in which the operating pressure of the fuel is at or below atmospheric pressure. This type of heater uses air pressure to deliver and atomize the fuel for combustion. Low pressure forced air heaters typically include at least a fuel tank, a combustion chamber, a motor driving a fan, a compressor, a fuel nozzle assembly, and an igniter. Air supplied by the compressor is delivered at a substantially consistent pressure to the fuel nozzle assembly by virtue of an accompanying regulator. The compressed air moving through the fuel nozzle assembly creates suction on a fuel line that runs from the fuel nozzle assembly to the fuel tank. The suction draws fuel from the fuel tank into the fuel nozzle assembly and the compressed air delivers the fuel through the nozzle and causes it to be atomized and expelled through the nozzle output. The atomized fuel is delivered into the combustion chamber in the vicinity of the igniter, which may be a spark plug, glow plug, hot surface igniter, or the like, where it is ignited. The fan typically provides secondary combustion air, cooling air, and also serves to discharge the heated air through the exhaust end of the combustion chamber.

DETAILED DESCRIPTION

Figure 1:
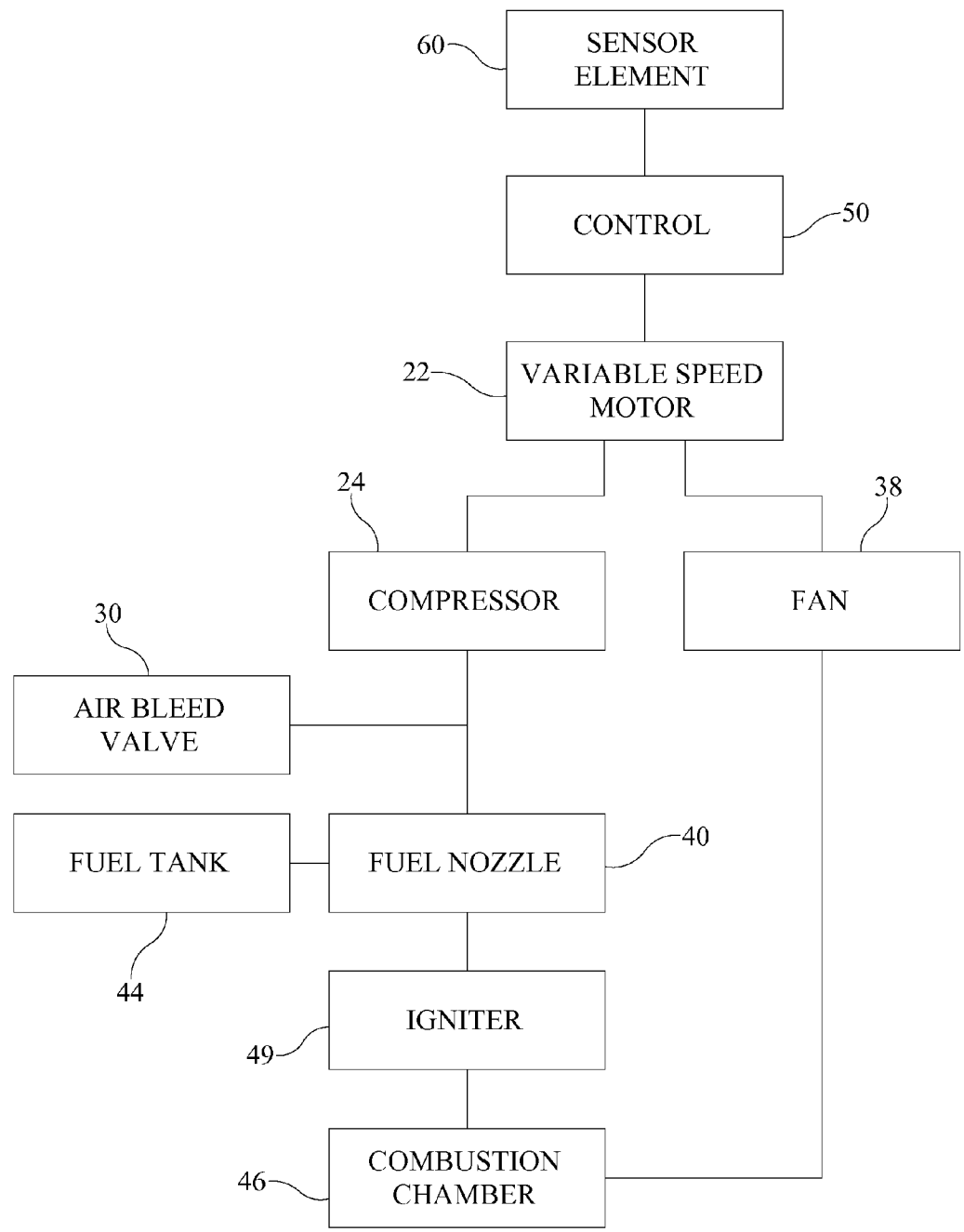
FIG. 1 is a schematic of one embodiment of a low pressure forced air heater of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "attached," "connected," and "coupled" and variations thereof are not restricted to physical or mechanical attachments, connections, or couplings. Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are shown in FIGS. 1-5 various aspects of a low pressure forced air heater. The diagram of FIG. 1 schematically illustrates one embodiment of a low pressure forced air heater 10 and FIGS. 2-5 provide exemplary physical embodiments of constituent parts that may comprise part of low pressure forced air heater 10.

Figure 2:
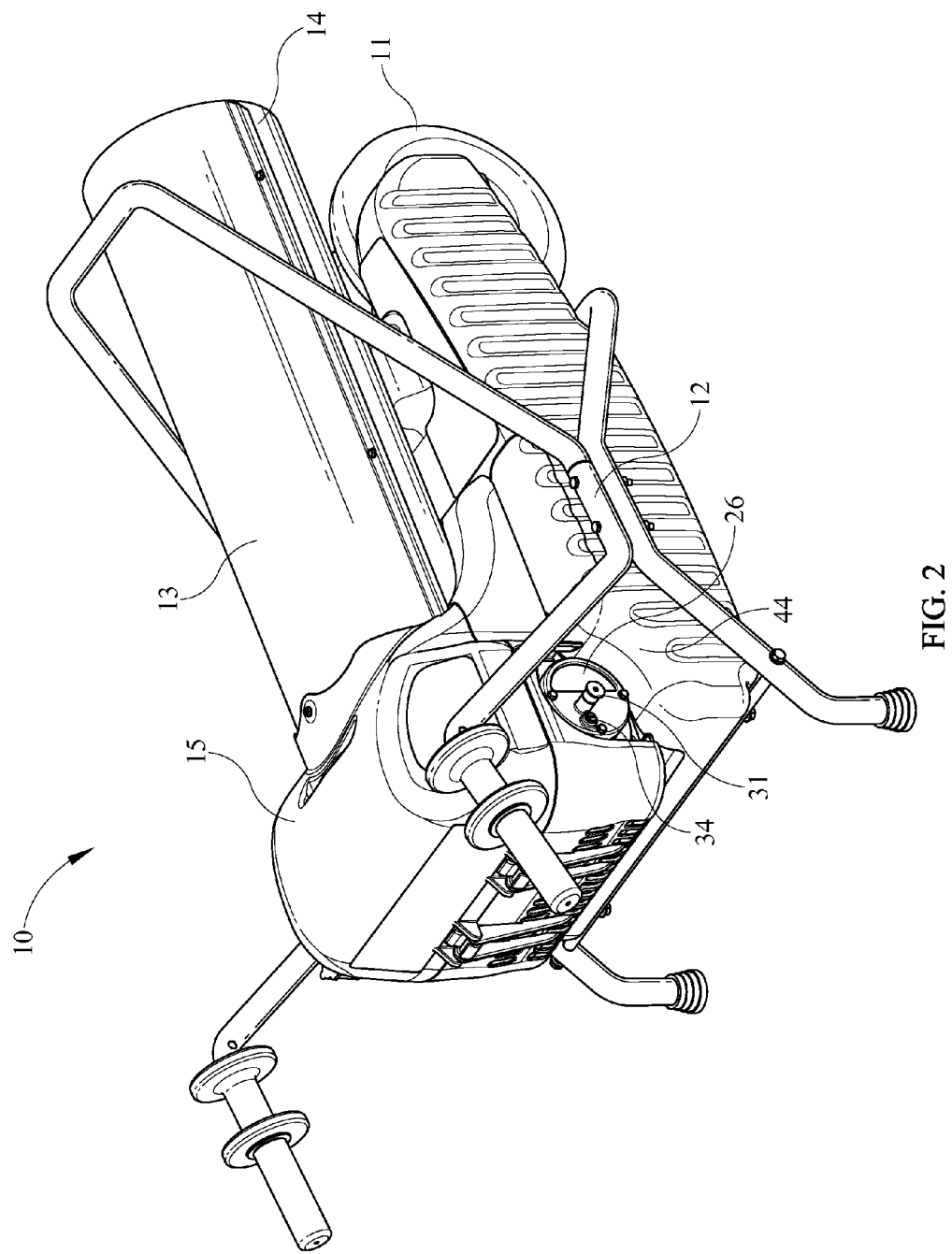
FIG. 2 is a top perspective view of one embodiment of a low pressure forced air heater of the present invention.

FIG. 2 depicts one embodiment of low pressure forced air heater 10 having a front wheel 11 and support and handle assembly 12, which cooperatively provide support and mobility for low pressure forced air heater 10. Also shown is a top combustion chamber housing 13 and a lower combustion chamber housing 14, which cooperatively house at least a combustion chamber 46, shown most clearly in FIG. 3. Rear housing 15 houses other constituent parts of low pressure forced air heater 10 that will be described with more detail below. Fuel tank 44 is used to store fuel for use in low pressure forced air heater 10 and, as known in the art and described below, can be a variety of reasonable sizes, shapes, and depths, and may be located in a variety of locations on low pressure forced air heater 10. The fuels that can be stored in fuel tank 44 and used in low pressure forced air heater 10, include, but are not limited to, heating oil, kerosene, diesel, Jet A, and JP8. Also shown is air intake filter 26, stem 31, and pressure tap 34 which may be provided in some embodiments and will be described with more detail below. As will become apparent, low pressure portable forced air heater 10, and in particular the design, housings, and shape of the heater, may take on a number of embodiments and the embodiment of FIG. 2 is provided for exemplary purposes only.

Figure 3:
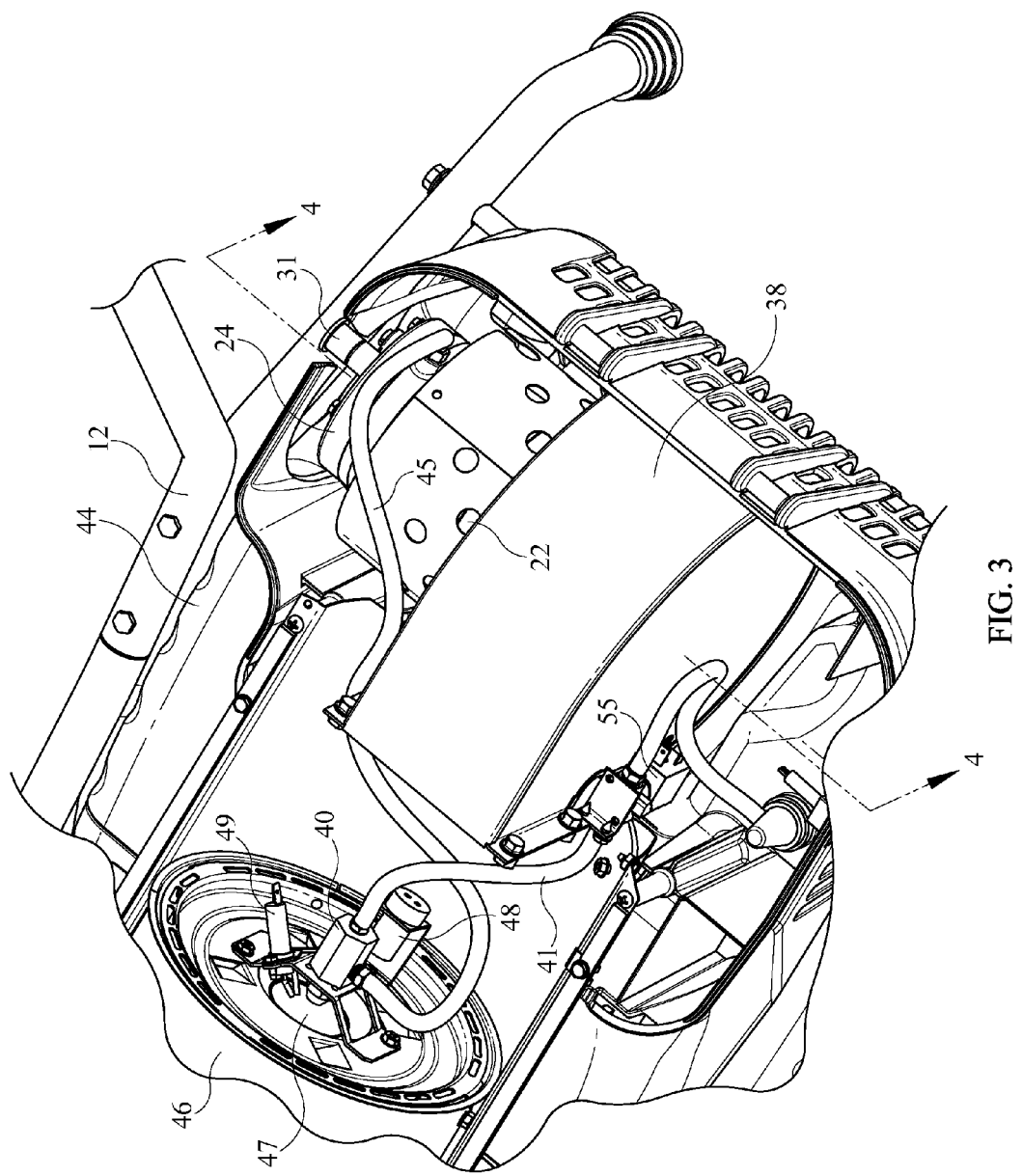
FIG. 3 is a top perspective view of a portion of the low pressure forced air heater of FIG. 2 with the rear housing and upper combustion chamber housing removed.

Moving now to the diagram of FIG. 1 and to FIG. 3, where a portion of low pressure forced air heater 10 is shown with top combustion chamber housing 13 and rear housing 15 removed. Variable speed motor 22 drives both compressor 24 and fan 38. In some embodiments variable speed motor 22 is a single motor of the AC type connected to line voltage and simultaneously drives both compressor 24 and fan 38 In some embodiments variable speed motor 22 is of the DC type and powered through a battery or a power supply connected to line voltage. In some embodiments, variable speed motor 22 is able to operate over a range of AC line voltages, such as a 90-140 volt range. Moreover, in some embodiments variable speed motor 22 could comprise two separate variable speed motors acting in substantial unison and operating at similar rotations per minute, one driving compressor 24 and the other driving fan 38. In addition, in some embodiments variable speed motor 22 could comprise one or more single speed motors that act in conjunction with a variable speed compressor and fan. In addition, in some embodiments variable speed motor 22 could comprise one or more electromagnetic fields that drive a compressor and fan that operate at variable speeds dependent upon the strength of the one or more electromagnetic fields.

Variable speed motor 22 may take on other embodiments and the term "variable speed motor" is used broadly herein. Also, the term "drive" is used broadly herein and encompasses any embodiment of variable speed motor 22 causing compressor 24 and/or fan 38 to produce output. Regardless of the embodiment, variable speed motor 22 is capable of working in conjunction with compressor 24 and fan 38 to cause them to operate at variable outputs. Likewise, compressor 24 and fan 38 may take on a number of embodiments, some of which may be dependent on the particular embodiment of variable speed motor 22, and those terms are likewise used broadly herein.

The output at which variable speed motor 22 causes compressor 24 and fan 38 to operate at any given time is dependent on the input received from output of a control 50. Control 50 could output and provide a number of electrical signals to variable speed motor 22 in order to vary its speed. These include, but are not limited to, providing different voltage levels to variable speed motor 22 via any number of voltage dropping devices, providing a pulse width modulated signal of varying duty cycles to variable speed motor 22, delivering wave conditioned voltage by wave chopping through electronic switches, relays, and the like to variable speed motor 22, and providing an electrical signal that enables a control unit attached to variable speed motor 22 to alter the speed. These are all exemplary of the multitude of ways in which control 50 can communicate with variable speed motor 22 in order to alter the speed of variable speed motor 22. Since variable speed motor 22 drives both compressor 24 and fan 38, altering the speed of variable speed motor 22 varies the output of compressor 24 and fan 38 substantially in proportion and substantially in tandem.

Compressor 24 can be any of a variety of compressor types and sizes so long as it is capable of compressing a quantity of air appropriate for the particular low pressure forced air heater 10 in which it is installed to a pressure that is also appropriate for the particular unit in which it is installed. In some embodiments, compressor 24 is of the carbon vane type. In other embodiments compressor 24 is constructed from non-carbon materials, such as, but not limited to, plastic. In other embodiments compressor 24 is of a type other than vane. Also, compressor 24 may take on a number of different embodiments to enable it to operate at a variable output with any embodiment of variable speed motor 22. The output requirements of compressor 24 for any particular low pressure forced air heater 10 are dependent on a number of factors, which can include, but are not limited to BTU output of the heater and the size of the heater's fuel tank. One skilled in the art will be able to consider these factors and others and choose an appropriate compressor 24 for placement in fuel and air delivery system 20 of a given low pressure forced air heater 10. Also, one skilled in the art will realize that oftentimes the compressor 24 chosen may be oversized for the application due to output variations caused by production tolerances.

Figure 5:
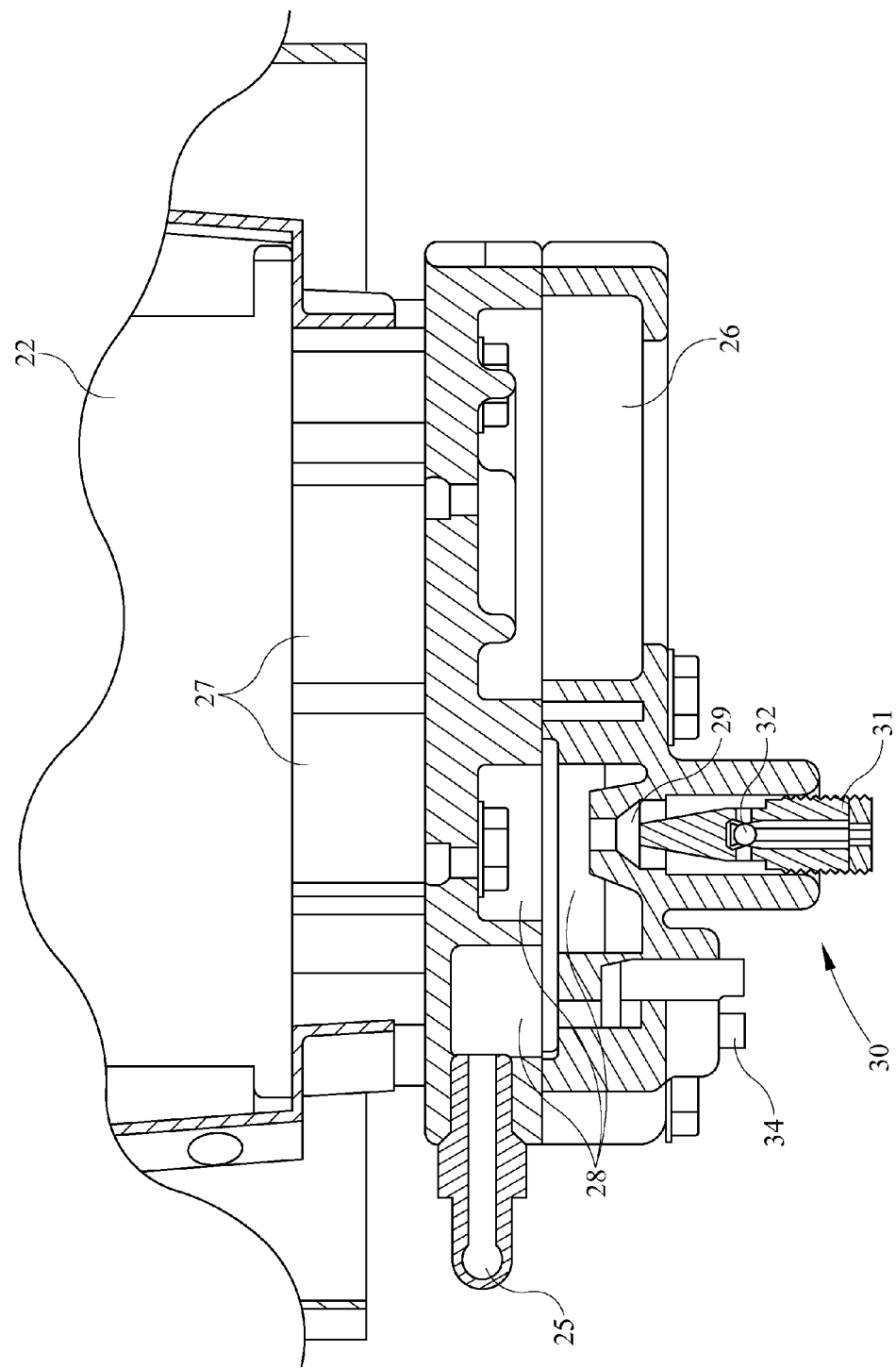
FIG. 5 is a closer view of a portion of the compressor of FIG. 4.

Regardless of the type and size of compressor 24 chosen, it intakes air from the external environment at atmospheric pressure, compresses the air, and outputs the compressed air into a pressure cavity 28, which in some embodiments is a chamber such as that illustrated in FIG. 5. Likewise, in some embodiments pressure cavity 28 is simply an air line in communication with the output of compressor 24 and also in communication with an air bleed valve 30 and an air output orifice 25. As will become clear, pressure cavity 28 may take on a number of configurations so long as it is in communication with compressed air output from compressor 24 and is also in communication with air bleed valve 30 and air output orifice 25. Regardless of the configuration of pressure cavity 28, a static amount of the outputted compressed air entering pressure cavity 28 passes through an air bleed valve 30 and into the external environment and a portion through an air output orifice 25, either orifice of which may be integral or non-integral with compressor 24 and pressure cavity 28. Air bleed valve 30 can be any number of bypass valves that are adjustable to allow a static amount of the compressed air output by compressor 24 to be vented to the external environment. Air output orifice 25 outputs the excess compressed air produced by compressor 24 and not vented through air bleed valve 30 and communicates it to an air orifice of fuel nozzle 40, preferably via an air line 45, shown most clearly in FIG. 3. Compressed air that is output through air output orifice 25 will occasionally be referenced as "primary air" throughout the remainder of this specification.

Figure 4:
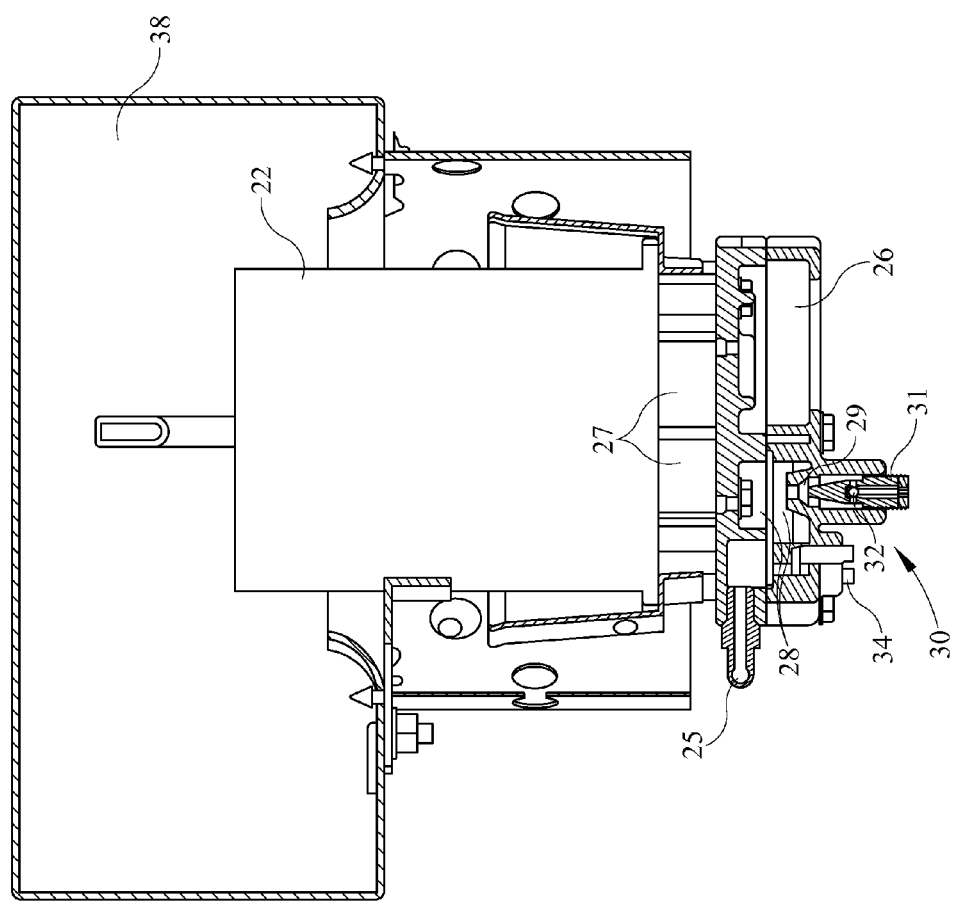
FIG. 4 is a sectional view of a portion of the low pressure portable forced air heater of FIG. 3 taken along the line 4-4 and showing a fan, variable speed motor, and a compressor having an integral pressure cavity, air output orifice, pressure tap, air intake filter, and air bleed valve.

With reference to FIG. 4 and FIG. 5, one embodiment of compressor 24 and air bleed valve 30 is described in more detail. Compressor 24 intakes air from the external environment at atmospheric pressure through air intake filter 26, the air is compressed in compression chamber 27, and the compressed air is output through an output filter and into integral pressure cavity 28. The compressed air is communicated from pressure cavity 28 to air output orifice 25 and air bleed valve 30. Air bleed valve 30 in this embodiment consists of a needle valve having an orifice 29 and a stem 31 that has a conical needle on one end. Stem 31 is preferably threadedly engaged with orifice 29 and by turning stem 31 on the thread, rotational motion transfers into linear displacement of stem 31 and its conical needle inside orifice 29. Resultantly, the opening area of orifice 29 is altered through threaded adjustment of stem 31. Stem 31 is provided with an air bleed orifice 32 in communication with both orifice 29 and the external environment, through which pressurized air is output to the external environment. The amount of air which reaches air bleed orifice 32 and that is resultantly vented to the external environment is determined through threaded adjustment of stem 31, which controls the amount of air passing through bleed orifice 29. Stem 31 is preferably factory adjusted such that a specified pressure is delivered to air output orifice 25, and, resultantly, to fuel nozzle 40, when compressor 24 is operating at full speed. A pressure tap 34 is preferably provided enabling an external pressure gauge or sensor to measure the pressure level within pressure cavity 28 to aid in factory adjustment of air bleed valve 30.

Of course, air bleed valve 30, pressure cavity 28, and air output orifice 25 could take on a number of configurations and could interact with compressor 24 in a number of ways. For example, in some embodiments compressor 24 could communicate pressurized air to a pressure cavity 28 that is non-integral with compressor 24, and that has an air output orifice 25 in communication with a fuel nozzle 40 and an air bleed valve 30 set to vent a static amount of air. In some embodiments pressure cavity 28 is an air line. In some embodiments air bleed valve 30 could be a ball valve or any other type of valve adjustable to bypass a static amount of air. One skilled in the art will recognize that many other variations of air bleed valve 30 are also possible as are different configurations of the design, interaction, and communication between compressor 24, pressure cavity 28, air bleed valve 30, and air output orifice 25.

Any embodiment of air bleed valve 30 is adjustable to enable a specified amount of air to pass from the compressor output to the external environment. The amount of air that air bleed valve 30 should pass in some embodiments is determined by the difference between the output capacity of compressor 24 when driven by variable speed motor 22 at the highest speed of variable speed motor 22 and the desired maximum output pressure of air passed through air output orifice 25 to fuel nozzle 40. For exemplary purposes only, assume it is desired to pass a maximum of 6 PSI to fuel nozzle 40 and compressor 24 is oversized (which is oftentimes the case due to output variations caused by production tolerances) and outputs air at 10 PSI to fuel nozzle 40 when fully driven by variable speed motor 22. In such an exemplary scenario, air bleed valve 30 could be adjusted such that air passes to the external environment and when variable speed motor 22 is at its highest speed and driving compressor 24 to maximum output, 6 PSI is actually being delivered to fuel nozzle 40. Using this same example, if variable speed motor 22 is slowed the compressor 24 output capacity will be reduced proportional to the reduction in motor speed, resulting in a proportional reduction in air pressure delivered to fuel nozzle 40, since air bleed valve 30 is still adjusted to bypass air. If compressor 24 wears or is serviced and its output pressure at the maximum speed of variable speed motor 22 changes, air bleed valve 30 can be appropriately adjusted to enable a desired PSI to still be delivered to fuel nozzle 40 at the highest speed of variable speed motor 22.

The amount of excess air that air bleed valve 30 should pass in some embodiments is determined with reference to some speed less than the full speed of variable speed motor 22. For example, assume it is desired to pass a maximum of 6 PSI to fuel nozzle 40 and compressor 24 produces 10 PSI when fully driven by variable speed motor 22, but produces only 9 PSI when variable speed motor is operating at 90% of its maximum speed. If this is the case, then air bleed valve 30 could be adjusted to pass the appropriate amount of air to the external environment to deliver 6 PSI to nozzle 40 and control 50 could cause variable speed motor 22 to operate at a speed that is actually approximately 90% of its maximum speed. The pressure of air delivered to fuel nozzle 40 by compressor 24 can then be decreased by slowing variable speed motor 22 below this 90% theoretical maximum speed, which resultantly causes less than 6 PSI to pass through air output orifice 25. When air bleed valve 30 is set with reference to some motor speed less than maximum, reduction in output by compressor 24 due to wear can be compensated for by simply increasing the speed of variable speed motor 22 and without adjustment to air bleed valve 30 (although adjustment of air bleed valve 30 is still an option). As will become apparent in the remainder of the specification, such a reduction in output by compressor 24 due to wear can be detected by sensor element 60 and communicated to control 50, which can alter its output accordingly to maintain the speed of variable speed motor 22 and output of compressor 24 at desired levels. As will also become apparent, this can be done automatically without intervention from a user.

As previously indicated, fuel nozzle 40 is in communication with and receives the output from air output orifice 25. Fuel nozzle 40 can be any number of aspirator type fuel nozzles usable in low pressure forced air heaters. In the embodiment depicted in the Figures, fuel nozzle 40 has an air orifice that is in communication with and receives pneumatic output from air output orifice 25. Fuel nozzle 40 also has a fuel orifice, which is in communication with fuel tank 44 of low pressure forced air heater 10, via a fuel line 41. In some embodiments, primary air received by fuel nozzle 40 from compressor 24 passes through internal directional slots of fuel nozzle 40 then through an annular orifice where the primary air velocity increases and passes over the fuel orifice, creating a vacuum that causes fuel to lift from fuel tank 44 and be delivered through the fuel orifice of nozzle 40. Air and fuel are then forced from fuel nozzle 40 to project an atomized air-fuel mixture into combustion chamber 46, where it is combusted. An igniter 49, located proximal to the discharge of fuel nozzle 40 may be operated intermittently, continuously, or only at startup, to provide for ignition and the subsequent combustion of any fuel exiting fuel nozzle 40. Fuel nozzle 40 and igniter 49 are provided in or proximal to an input port 47 of combustion chamber 46. Igniter 49 may be a piezoelectric igniter, spark plug, glow plug, hot surface igniter, or any other type of igniter suitable for use in a forced air heater and in some embodiments is controlled via electrical output from control 50.

Like compressor 24, fan 38 is also driven by variable speed motor 22 and may take on a number of embodiments. Moreover, fan 38 may also take on a number of different embodiments to enable it to operate at a variable output with any embodiment of variable speed motor 22. The air provided by fan 38 will occasionally be referenced as "secondary air" throughout the remainder of this specification and is provided to combustion chamber 46 and in some embodiments is also provided around fuel nozzle 40. Fan 38 can be placed in a number of places on low pressure forced air heater 10 so that the secondary air it provides is in communication with combustion chamber 46. In some embodiments, output from fan 38 also passes around fuel nozzle 40 and is mixed into the dispersed atomized fuel that exits fuel nozzle 40 to aid in combustion of the fuel. In some embodiments output from fan 38 also cools combustion chamber 46, cools other parts of low pressure forced air heater 10, and aids in dispersing heat from combustion chamber 46 into the external environment by forcing heat from combustion chamber 46 through a discharge port of combustion chamber preferably located distal to input port 47.

Since variable speed motor 22 drives both fan 38 and compressor 24, as the speed of variable speed motor 22 is decreased, the amount of secondary air provided by fan 38 is reduced and the amount of primary air provided to fuel nozzle 40 is also reduced. Since the pneumatic output through air output 25 is affected by air bleed valve 30, the pressure entering fuel nozzle 40 drops in substantial proportion to the drop in secondary air supplied by fan 38. As a result of the drop in primary air, there is a decrease in vacuum at the fuel orifice of fuel nozzle 40 and less fuel is disbursed by fuel nozzle 40. This decrease in fuel is accompanied by a decrease in secondary air and a decrease in primary air. Since theses decreases occur in substantial proportion, the output of low pressure forced air heater 10 can be varied, while a substantially constant air to fuel ratio is maintained. There are limits to how much the speed of variable speed motor 22 can be scaled back, since a minimal amount of air pressure must be delivered to fuel nozzle 40 in order for fuel to be lifted from tank 44 and for atomization of the fuel to occur. However, this amount of air pressure can easily be determined and taken into consideration during design of low pressure forced air heater 10.

Of course, the air to fuel ratio will still vary as a result of fuel level changes in tank 44. However, the air to fuel ratio variation caused by the changing fuel levels alone will not be significant enough to cause bad combustion as long as appropriate parameters are chosen for the particular low pressure portable forced air unit. Therefore, low pressure forced air heater 10 can maintain desirable combustion characteristics while varying its heat output, regardless of the fuel level of the tank As previously discussed, control 50 provides an electrical signal to variable speed motor 22 to control its speed. Control 50 can comprise digital logic, a programmable logic device, a programmed microprocessor, a potentiometer, or any other suitable electronic control device and may include integral or non-integral memory. In some embodiments, control 50 comprises a microprocessor with integral memory. Inherent tolerances in variable speed motor 22 and variations in motor load caused by tolerances associated with compressor 24, fan 38, fuel nozzle 40, and the like, make it very unlikely that a given electrical signal will produce a given motor speed and a given heater output for two similarly constructed low pressure forced air heaters. Thus, the characteristics of the electrical signal delivered by the output of control 50 at any given time, and determination of motor speed and heater output, as discussed below, are preferably at least partially dependent on input from a sensor element 60, which may provide direct or indirect indications of the motor speed and heater output.

As depicted in FIG. 2, control 50 is preferably in electrical communication with sensor element 60. Sensor element 60 comprises at least one sensor and may comprise a plurality of sensors. By way of example only, several of the sensors that could form, in whole or in part, sensor element 60, will be described. Also, by way of example only, description may be provided outlining one or more exemplary ways control 50 may utilize data provided by a particular sensor element 60. With any sensor of sensor element 60, control 50 may store all or portions of data provided by the sensor, may use data provided by the sensor as all or part of a determination of proper or improper operation of low pressure forced air heater 10, may use the data as an indication of motor speed, compressor output, burner performance, or heater output, and may cause data supplied by sensor element 60 to be displayed on an information display [not shown] that is in electrical communication with control 50. The information display could include, but is not limited to, a liquid crystal display, one or more gauges, or one or more light emitting diodes. In addition, dependent on data received, control 50 may, among other things, adjust low pressure forced air heater 10 operation, or cause all or portions of low pressure forced air heater 10 to shut down, cause warning messages or sounds to occur, turn igniter 49 on or off, adjust the speed of variable speed motor 22, or operate an electronically controlled fuel solenoid valve 55, shown most clearly in FIG. 3, in line with fuel supply line 41.

One such sensor that could comprise sensor element 60 in whole or in part is a potentiometer having a rotatable knob adjustable by a user in the field to select a particular heat output level. The positioning of the rotatable knob by the operator could determine the magnitude of a variable voltage signal indicative of the selected heat output level. Control 50 could read the signal and send an appropriate signal to variable speed motor 22 to achieve the heat output level. Likewise, the knob could be rotatable to select a temperature or temperature range that control 50 could maintain via proper control of variable speed motor 22. Alternatively, the voltage signal that is indicative of the selected heat output level or temperature could be directly connected to variable speed motor 22 and designed so as to allow for variation of the motor speed and resultantly, variable output. In such a situation, the rotatable knob would be considered sensor element 60, the potentiometer would be considered control 50, and the variable voltage being delivered considered the output of control 50.

Another sensor could be a photo sensor 48 such as a fast photocell, a light sensitive resistor, or a fiber optic cable connected to a phototransistor, photoresistor, or photodiode. An example of such a photo sensor 48 is shown most clearly in FIG. 3. Such a photo sensor 48 would have a view of the combustion process in combustion chamber 46 of low pressure forced air heater 10 through an opening in combustion chamber 46, or other appropriate location. The data obtained by photo sensor 48 could be used by control 50 to monitor, among other things, flame quality, flame turbulence, flame intensity, and flame color. Control 50 could utilize the photo sensor data for a number of purposes, including monitoring combustion, verifying integrity of fan 38, obtaining an indirect indication of the fuel level of fuel tank 44, and controlling igniter 49.

Combustion can be monitored through analysis of sensor data and adjustment or shutdown of low pressure forced air heater 10 or one of its constituent parts can be performed if photo sensor 48 readings do not correlate to acceptable combustion limits. This enables conditions such as blocked air intake, blocked heater outlet, and fan loss or decoupling to be quickly recognized and allows for quick adjustment or shutdown under those and other unintended operational conditions. Fan 38 integrity can be similarly monitored through analysis of photo sensor 48 data, and shutdown performed if improper fan 38 operation occurs. Fuel tank level is able to be indirectly monitored by a photo sensor because of the changes in combustion characteristics that occur as a result of the inherent changes in air to fuel ratio that occur as the fuel level in tank 44 decreases. These changes in air to fuel ratio can be detected via monitoring of photo sensor 48 and control 50 can display low fuel notifications on an information display, elsewhere, audibly, or use the data for other purposes. Also, by monitoring the combustion process, igniter 49 can be selectively controlled. For example, control 50 could cause igniter 49 to only be energized during the ignition cycle, and only reenergized should an event occur that warrants ignition, such as upon loss of combustion, during heater shutdown, or intermittently during heater operation to burn off any carbon deposits that may develop.

Another sensor could be a line voltage sensor such as a voltage divider monitored by control 50. If the voltage monitored by control 50 is too high or too low, control 50 may remove power or prevent power from being applied to variable speed motor 22 or igniter 49 to prevent damage to the components and a message or a code indicating high voltage may be displayed visually or audibly.

Other sensors that may form part of sensor element 60 include a carbon monoxide sensor or carbon dioxide sensor incorporated to monitor air quality and programmable timers to turn the heater on or off. Again, the entirety of the sensors described and their placement in low pressure forced air heater 10 are merely exemplary of the multitude of sensors that could be placed in a multitude of places and could form in whole or in part sensor element 60. Additionally, the descriptions of the several ways control 50 may utilize data from any given sensor are merely exemplary of the plurality of ways such data might be used.

Control 50 could also contain an incorporated delay lockout period to prevent rapid on and off cycling of low pressure forced air heater 10. After a predetermined amount of ignition failures, the delay lockout period would prevent low pressure forced air heater 10 from restarting for a predetermined amount of time to allow any unburned fuel to escape combustion chamber 46 and to allow combustion chamber 46 to cool for a predetermined amount of time.

As previously mentioned, an information display could be in electrical communication with control 50. Preferably the information display is a digital display, such as, but not limited to, an LCD screed or an array of Light Emitting Diodes (LEDS). However, the information display could also consist, in whole or in part, of one or more analog displays, such as a dial indicator. The information display could display a plethora of information, such as current heater mode, ambient temperature, desired temperature, heat output level, diagnostic information, or any other information garnered directly or indirectly from sensor element 60.

Control 50 could also be in electrical communication with a fuel solenoid valve 55 inserted in a fuel supply line, such as fuel supply line 41 of FIG. 3. Control 50 could selectively operate the fuel solenoid valve to either allow or prevent fuel from passing from fuel tank 44 to fuel nozzle 40. Thus, control 50 could cause the fuel solenoid valve to prevent fuel from passing from fuel tank 44 and operate variable speed motor 22 to allow for operation of low pressure forced air heater 10 without suction of fuel. This would enable operation of low pressure forced air heater for cooling or ventilating purposes and allow heat to be purged from combustion chamber 46 following shutdown of the heater.

The foregoing description of structures and methods has been presented for purposes of illustration. It is not intended to be exhaustive or to limit the invention to the precise steps and/or forms disclosed, and obviously many modifications and variations are possible in light of the above teaching. It is understood that while certain forms of the low pressure forced air heater have been illustrated and described, it is not limited thereto except insofar as such limitations are included in the following claims and allowable functional equivalents thereof.

I claim:

1. A low pressure forced air heater, comprising:
a variable output fan;
a variable output air compressor;
a variable speed motor driving said fan and said air compressor;
a fuel nozzle having a fuel orifice, an air orifice, and an output orifice;
an air output orifice and an air bleed valve each in communication with a pneumatic output of said air compressor;
wherein said air bleed valve is capable of venting a first portion of said pneumatic output and allowing a second portion of said pneumatic output to pass through said air output orifice;
said air orifice of said fuel nozzle being in communication with said second portion of said pneumatic output of said air output orifice and wherein said fuel orifice being in communication with a fuel tank;
a combustion chamber, said combustion chamber operably positioned to receive output from said output orifice of said fuel nozzle and output communicated from said fan;
an igniter, operably positioned proximal to said fuel nozzle; and
said variable speed motor having a first speed and a second speed, wherein said first speed is greater than said second speed, when at said first speed said air orifice of said fuel nozzle operates at a first pressure and when at said second speed said air orifice of said fuel nozzle operates at a second pressure, wherein said first pressure and said second pressure are relative to said second portion of said pneumatic output unvented by said air bleed valve.

2. The low pressure forced air heater of claim 1, wherein said air bleed valve includes an orifice at least partially housing an adjustable stem.

3. The low pressure forced air heater of claim 2, wherein said stem has at least one orifice therethrough, said at least one orifice being in communication with an external environment and with said orifice housing.

4. The low pressure forced air heater of claim 3, wherein said stem is threadably housed in said orifice and wherein threaded adjustment of said stem causes said first portion of said pneumatic output capable of passing through said at least one orifice of said stem to vary.

5. The low pressure forced air heater of claim 1, wherein said air bleed valve is adjusted so as to allow said second portion of said pneumatic output to pass through said air output orifice when said variable speed motor is operated at a designated speed.

6. The low pressure forced air heater of claim 1, wherein said air output orifice is integrally formed with said air bleed valve.

7. The low pressure forced air heater of claim 1, wherein said air output orifice is integrally formed with said air compressor.

8. The low pressure forced air heater of claim 7, wherein said air bleed valve is integrally formed with said air compressor.

9. The low pressure forced air heater of claim 1, wherein said first pressure is different from said second pressure.

10. A low pressure forced air heater, comprising:
a variable speed motor, said variable speed motor driving a fan and an air compressor, said air compressor having an output;
a pressure cavity in communication with said output of said air compressor;
an air output orifice and an air bleed valve in communication with said pressure cavity to allow a portion of said output to pass through said air output orifice;
a fuel nozzle having a fuel orifice, an air orifice, and an output orifice, wherein said air orifice of said fuel nozzle being in communication with said portion of said output passing through said air output orifice and wherein said fuel orifice being in communication with a fuel tank;
a combustion chamber, said combustion chamber operably positioned to receive output from said output orifice of said fuel nozzle and output communicated from said fan;
an igniter, operably positioned proximal to said fuel nozzle;
a control, said control being in electrical communication with a sensor element and said variable speed motor; and
wherein said control operable to modify the speed of said variable speed motor based at least partially on input received from said sensor element.

11. The low pressure forced air heater of claim 10, wherein said air bleed valve includes an orifice at least partially housing an adjustable stem.

12. The low pressure forced air heater of claim 11, wherein said stem has at least one orifice therethrough, said at least one orifice being in communication with an external environment and with said orifice housing.

13. The low pressure forced air heater of claim 12, wherein said stem is threadably housed in said orifice and wherein threaded adjustment of said stem causes the amount of air capable of passing through said at least one orifice of said stem to vary.

14. The low pressure forced air heater of claim 10, wherein said air bleed valve is a ball valve.

15. The low pressure forced air heater of claim 10, wherein said air bleed valve is adjusted so as to allow said portion of said output to pass through said air output orifice when said variable speed motor is operated at a designated speed.

16. The low pressure forced air heater of claim 10, wherein said pressure cavity is integrally formed with said air compressor.

17. The low pressure forced air heater of claim 10, wherein said pressure cavity is an air line.

18. The low pressure forced air heater of claim 10, wherein said variable speed motor is two variable speed motors acting in substantial unison.

19. A low pressure forced air heater, comprising:
a variable speed motor driving a fan and a compressor;
said compressor having a pneumatic output through an air output orifice and an air bleed valve, wherein said air bleed valve varies said pneumatic output through said air output orifice;
said pneumatic output through said air output orifice being in communication with a fuel nozzle;
said fuel nozzle also being in communication with a fuel tank;
wherein said variable speed motor varies the rotational fan speed of said fan between at least a first speed and a second speed and said pneumatic output to said fuel nozzle through said air output orifice between a first pressure and a second pressure, respectively, correspondingly in tandem relative to said pneumatic output through said air bleed valve to vary the heat output of said low pressure forced air heater.

20. The low pressure forced air heater of claim 19, wherein said low pressure forced air heater has a combustion chamber positioned to receive output from said fuel nozzle and said fan, said variable speed motor maintaining a substantially constant air to fuel ratio within said combustion chamber during operation of said low pressure forced air heater and throughout a range of speeds of said variable speed motor.

21. The low pressure forced air heater of claim 20, wherein the status and speed of said variable speed motor are determined by output of a control in electrical communication with said variable speed motor.

22. The low pressure forced air heater of claim 21, wherein the status of said output of said control is affected by input received from a sensor element in communication with said control.

23. The low pressure forced air heater of claim 19, wherein said compressor is a vane air compressor.

* * * * *